United States Patent [19]

Yamanaka

[11] 4,249,203
[45] Feb. 3, 1981

[54] SOLID STATE TELEVISION CAMERA

[75] Inventor: Seisuke Yamanaka, Mitaka, Japan

[73] Assignee: Sony Corporation, Tokyo, Japan

[21] Appl. No.: 941,313

[22] Filed: Sep. 11, 1978

[30] Foreign Application Priority Data

Sep. 14, 1977 [JP] Japan .................................. 52/110878

[51] Int. Cl.² .............................................. H04N 9/09
[52] U.S. Cl. ....................................... 358/50; 358/41;
358/21 R
[58] Field of Search ............................. 358/50, 41, 21

[56] References Cited
U.S. PATENT DOCUMENTS 3,975,760   8/1976   Yamanaka et al. ..................... 358/50

Primary Examiner—Richard Murray

Attorney, Agent, or Firm—Hill, Van Santen, Steadman, Chiara & Simpson

[57] ABSTRACT

A multi-chip type CCD color camera is designed to displace respective chips relative to an object image. The sampling action at respective CCD imager chips yields output signals having base-band components and sideband components partially overlapped with each other. In order to separate two components, frequency converting technique is introduced in the signal processing circuit, wherein these components are interchanged in frequency. It is very easy to cancel out original base-band components from respective CCD chips, because the phases of the base-band components are not influenced by chip displacement. Accordingly, there is no need to adjust precise chip alignment in order to improve the resolution of the CCD color camera.

7 Claims, 19 Drawing Figures

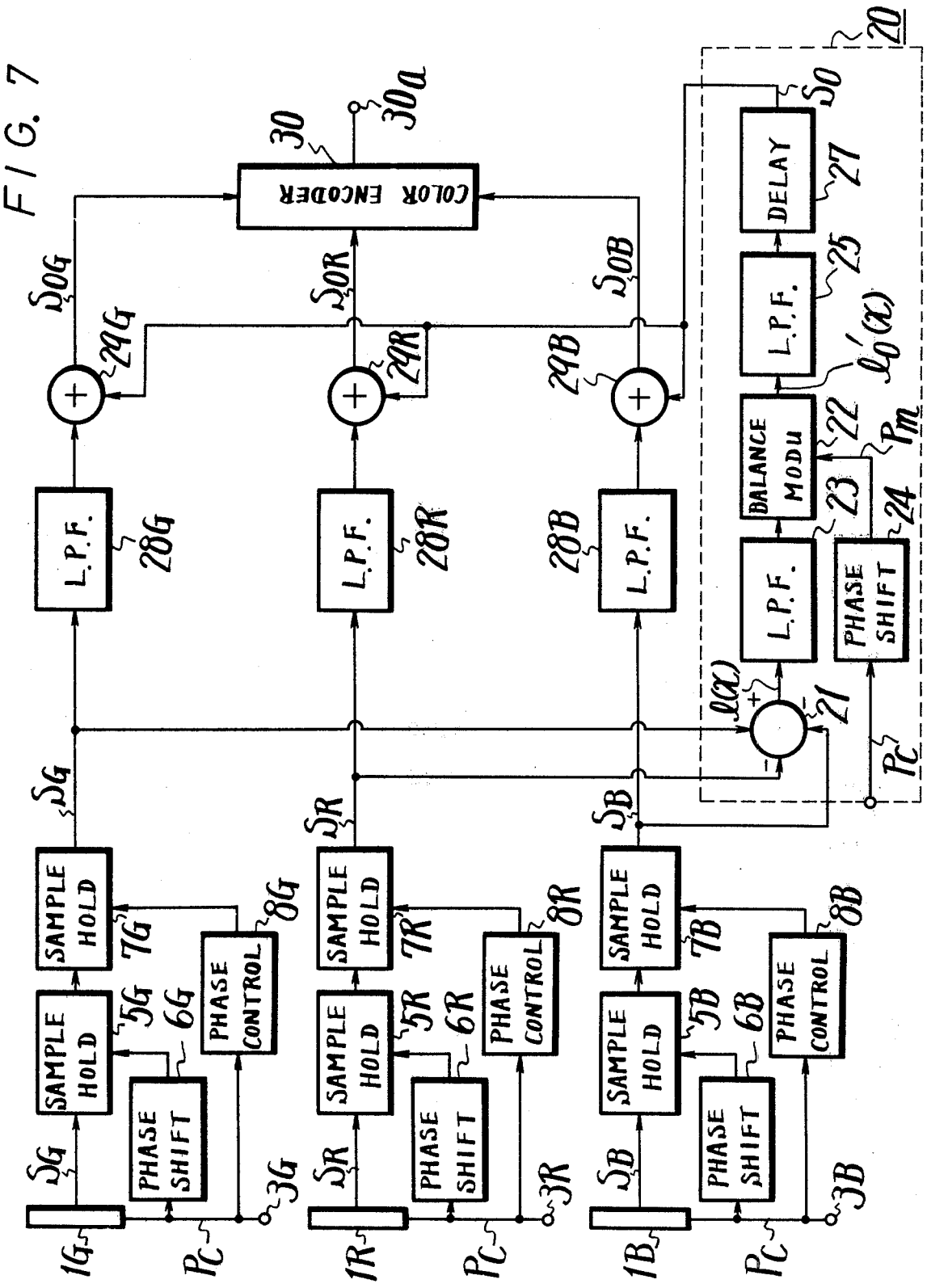

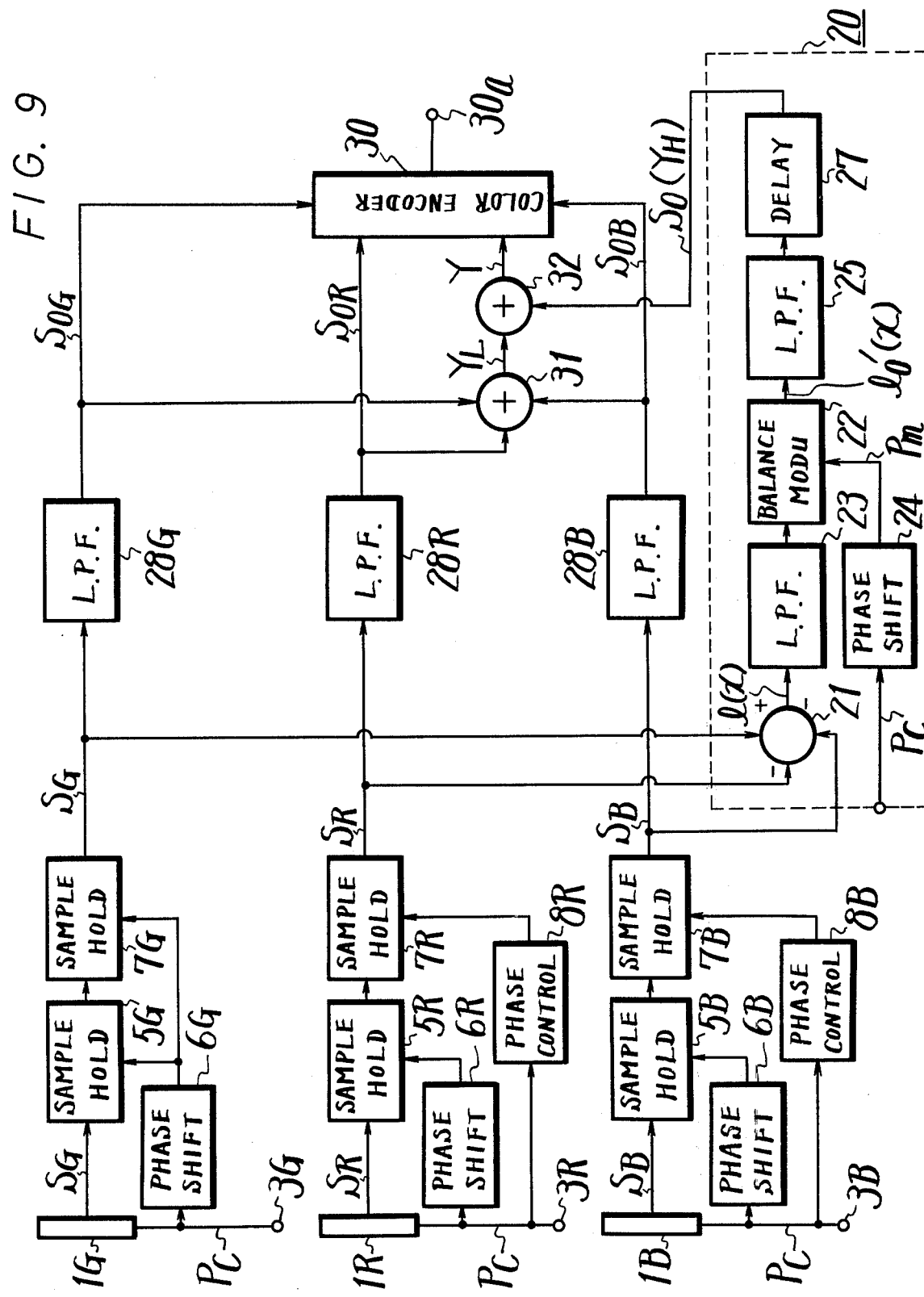

SOLID STATE TELEVISION CAMERA

BACKGROUND OF THE INVENTION

1. Field of the Invention

This invention relates to a solid state imaging apparatus, wherein solid state imaging devices such as COD (charge-coupled device) imagers are employed.

2. Brief Description of the Prior Art

Recently, the development of solid state television cameras has been very active. They employ solid state imaging devices such as photo-diode arrays, CCD imagers, BBD (bucket brigade device) imagers, and so on, instead of vidicon tubes. These solid state imaging devices have limited number of picture elements, therefore, it is very difficult to improve resolution of an image. If a plurality of imaging devices are employed in one camera system, the resolution of picked up images can be improved by suitable displacement of imagers and signal processings as shown in U.S. Pat. No. 3,975,760, which was assigned to the same assignee as the present application.

That is, three imaging chips or devices 1G, 1R and 1B are disposed with respect to a single focused image as shown in FIG. 1. In this case, with the focused image on the imaging device 1G being as a reference, the imaging device 1R is shifted therefrom in the horizontal direction by a distance corresponding to a phase $\theta_{12}$ and the imaging device 1b is shifted therefrom in the horizontal direction by a distance corresponding to a phase $\theta_{13}$. FIG. 1 is an example such as being arranged as a color camera system and hence color filters FR, FB and FG (not shown) are respectively disposed in front of the corresponding imaging devices 1R, 1B and 1G. Accordingly, a signal corresponding to red color is obtained from the imaging device 1R, and similarly a signal corresponding to blue color from the imaging device 1B and a signal corresponding to green color from the imaging device 1G, respectively.

In FIG. 1, if the alignment pitch of horizontally arranged picture elements 2 is taken as x and scanning time of this pitch x is $\tau_H$, sampling frequency $f_c$ for the focused image can be expressed as $f_c = 1/\tau_H$. In FIG. 1, y indicates an aperture width of each picture element 2, and $\tau_0$ a scanning time of this aperture width y. Further, the phases $\theta_{12}$ and $\theta_{13}$ correspond to the distance of $\frac{1}{3}$ x and $\frac{2}{3}$ x, respectively.

In the case that the spatial positioning of the focused image and the imaging devices is selected in a manner as mentioned above, if the respective imaging devices 1G, 1R and 1B are read out at proper sampling timings corresponding to the above positioning, the output levels and the phase relation as shown in FIG. 2 are obtained. FIG. 2 shows levels and phase relation of respective components of a composite output, in which $Y_B$ designates a base-band component and $Y_S$ a side-band component. Carriers of the side-band component $Y_S$ (sampling pulses) $C_G$, $C_R$ and $C_B$ have phase relation as shown in FIG. 2. It is assumed that the spatial phase relation can be correctly selected as $\theta_{12} = \frac{2}{3}\pi$ and $\theta_{13} = 4/3\pi$. In this case, upon picking up a black and white image, if outputs of three imaging devices are added together with their levels being made equal so as to produce a luminance signal, the side-band components $Y_S$ are cancelled by taking vector sums, while only the base-band components $Y_B$ remain.

As described above, when the alignment adjustment among the devices 1G, 1R and 1B is perfect, the side-band components are cancelled out so that a desired aim can be achieved. Meanwhile, if the alignment adjustment is imperfect, the side-band components are not cancelled but remain in the base-band components $Y_B$. Therefore, the quality of pictures can not be improved and also the frequency band can not be widened. As a matter of fact, however, each imaging device is small in size. Besides, with a device incorporated with several hundreds of picture elements in the horizontal direction, it is quite difficult to correctly provide a mechanical positioning corresponding to a time $\frac{1}{3}\tau_H$.

SUMMARY OF THE INVENTION

A first object of this invention is to provide a television camera system using a plurality of image sensors.

A second object of this invention is to provide a solid state camera which uses a plurality of image sensor chips to exhibit good resolution.

A third object of this invention is to provide a solid state color television camera which uses a plurality of image sensor chips with limited number of picture elements to produce a luminance signal having a high resolution.

As disclosed in U.S. Pat. No. 3,975,760 which has been previously filed and patented, signal processing with a high resolution can be effected by precise chip alignment and suitable signal handling. In the present invention, however, the precise chip alignment is not required. For this reason, an error signal compensating circuit is newly provided.

Each CCD imager provides an output containing base-band components and side-band components as mentioned above. The phases of the side-band components are much influenced by the chip alignment and read-out clocks, while the base-band components are not. Therefore, the original base-band components from respective CCD chips are cancelled to eliminate undesired signals from the resultant output signal. In the practical embodiment, a frequency converter is employed to interchange respective frequencies of side-band and base-band components. The original base-band components can be cancelled out either before the frequency conversion or after the frequency conversion.

This invention is applicable not only to a black and white television camera using a plurality of CCD imagers but also to a color camera system. When a luminance signal with high resolution is produced by the color camera, it is necessary for the levels of signals from respective chips to be properly adjusted to cancel base-band components upon taking a black and white image.

The other objects, features and advantages of this invention will be apparent from the following description taken in conjunction with the accompanying drawings.

BRIEF DESCRIPTION OF THE DRAWINGS

FIG. 7 is a block diagram showing one embodiment of this invention;

FIG. 9 is a block diagram showing another embodiment of this invention;

DESCRIPTION OF THE PREFERRED EMBODIMENTS

Before describing constructive arrangements of the invention, theoretical analysis will be given in conjunction with FIGS. 1 to 4.

Now, if a focused image is assumed to have only a single frequency component of p cycles, the focused image i(x) of spatial expression is given as follows:

$$i(x) = L' \cos 2\pi p x \quad (1)$$

where $L'$ is brightness level. Therefore, an output $l_G(t)$ from the device 1G is expressed as follows:

$$l_G(t) = K_G[R_G(p)\cos 2\pi p t + R_G(1/\tau_H - p)\cos 2\pi(1/\tau_H - p)t \quad (2)$$
$$+ R_G(1/\tau_H + p)\cos 2\pi(1/\tau_H + p)t + ...]$$

where $K_G = \dfrac{\tau_O}{\tau_H} \cdot \dfrac{\sin \pi \tau_O p}{\pi \tau_O p} \cdot L_G$      (3)

$\tau_H$ scanning time corresponding to the pitch x,
$\tau_O$: scanning time corresponding to the aperture width y.
$L_G$: level of green signal of the focused image i(x) derived from the imaging device.

Further, $R_G(f)$ ($f = p, 1/\tau_H - p, 1/\tau_H + p, \ldots$) indicates overall frequency characteristics after spatial sampling by the picture elements 2 contained in the imaging device 1G.

Figure 1:
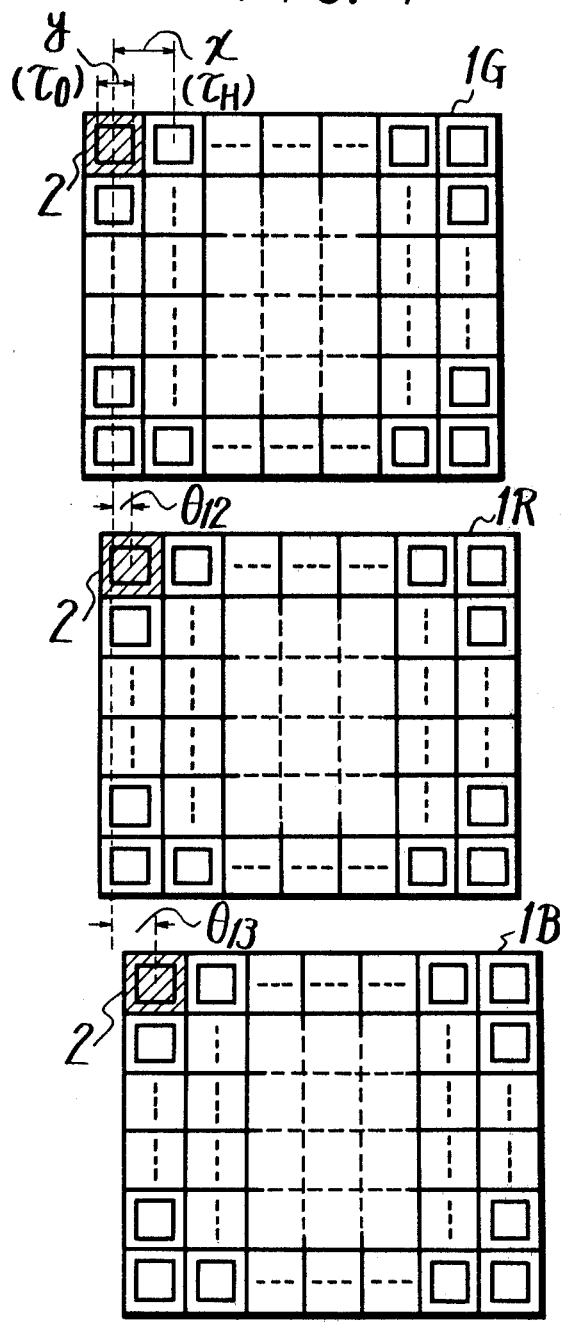
FIG. 1 is a view showing an arrangement of imaging devices used for explaining the invention.

Outputs $l_R(t)$ and $l_B(t)$ of the other devices 1R and 1B can also be expressed in the same manner as the equation (2). In this case, if the spatial positioning from the reference phase is taken as $\theta$ as mentioned above, a time deviation from the reference phase is taken as $\Psi$, and further the device 1G is selected to be a reference as shown in FIG. 1, the device 1R is adapted to be shifted by $\theta_{12}$ in space and $\omega_{12}$ in time. Similarly, the device 1B is adapted to be shifted by $\theta_{13}$ in space and $\Psi_{13}$ in time, respectively, as a result, outputs $l_R(t)$ and $l_B(t)$ are expressed as follows:

$$l_R(t) = K_R\{R_R(p)\cos[2\pi p t + (\theta_{12} - \psi_{12})\tau_H p] \quad (4)$$
$$+ R_R(1/\tau_H - p)\cos[2\pi(1/\tau_H - p)t - (\theta_{12} - \psi_{12})\tau_H p - \psi_{12}]$$
$$+ R_R(1/\tau_H + p)\cos[2\pi(1/\tau_H + p)t + (\theta_{12} - \psi_{12})\tau_H p - \psi_{12}]$$
$$+ ....\}$$
$$l_B(t) = K_B\{R_B(p)\cos[2\pi p t + (\theta_{13} - \psi_{13})\tau_H p] \quad (5)$$
$$+ R_B(1/\tau_H - p)\cos[2\pi(1/\tau_H - p)t - (\theta_{13} - \psi_{13})\theta_H p - \psi_{13}]$$
$$+ R_B(1/\tau_H + p)\cos[2\pi(1/\tau_H + p)t + (\theta_{13} - \psi_{13})\tau_H p - \psi_{13}]$$
$$+ ....\}$$

Figure 3A:
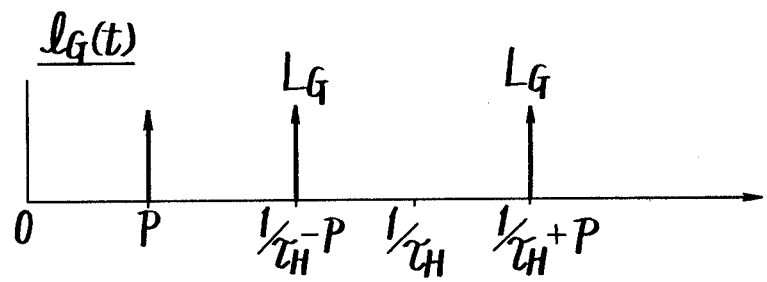
FIGS. 3A through 3C and FIGS. 4A through 4E are views showing phase relations which are used for explaining the invention.
Figure 3B:
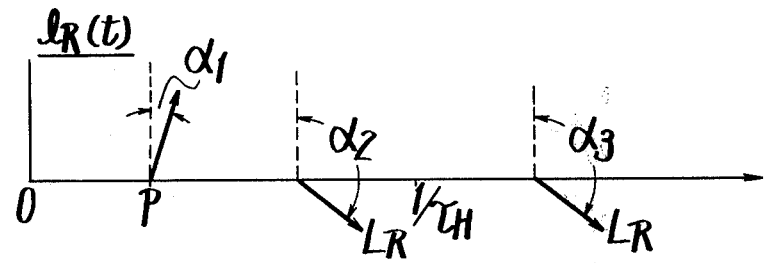
Figure 3C:
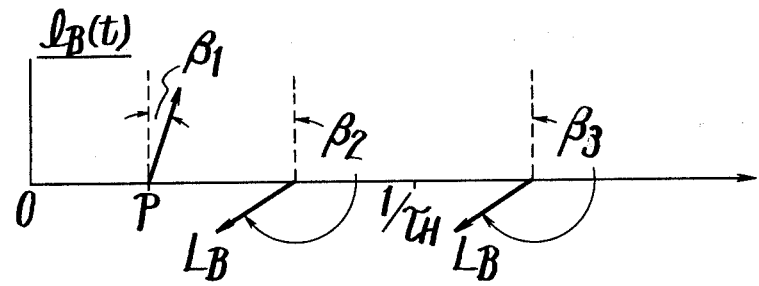

The phase relations of these outputs $l_G(t)$, $l_R(t)$ and $l_B(t)$ are shown in FIGS. 3A, 3B and 3C.

In the case that, for example, the spatial phase $\theta_{12}$ of the intermediate device 1R is not a proper phase corresponding to $\frac{2}{3}\pi$ relative to the output $l_G(t)$, the phase $\Psi_{12}$ has to be also changed that much in accordance with the phase $\theta_{12}$ containing the above deviation, so that the following relation is obtained.

$$\Psi_{12} = \theta_{12} \quad (6)$$

Even in such a case, as will be apparent from the equations (4) and (5), the phase $\Psi_{12}$ deviated from the proper state exists in the phase terms of side-band components. Accordingly even if the outputs $l_G(5)$, $l_R(t)$ and $l_B(t)$ are added together, side-band components will still exist.

Figure 4A:
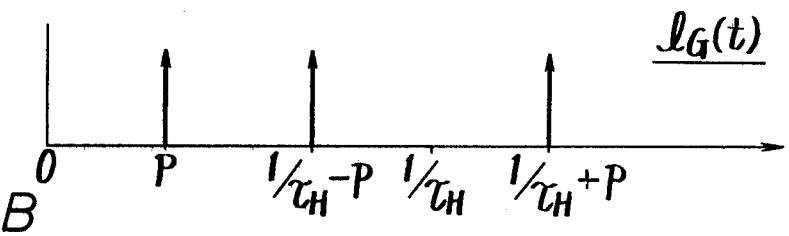
Figure 4B:
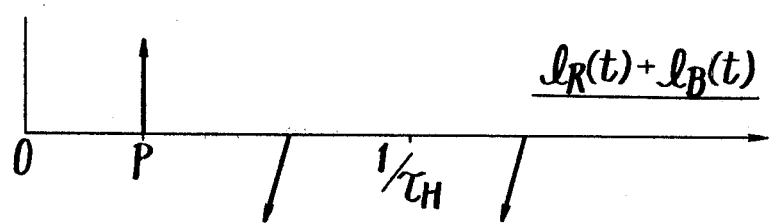
Figure 4C:
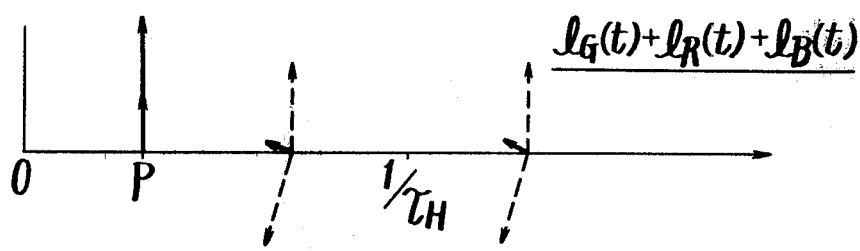
Figure 4D:
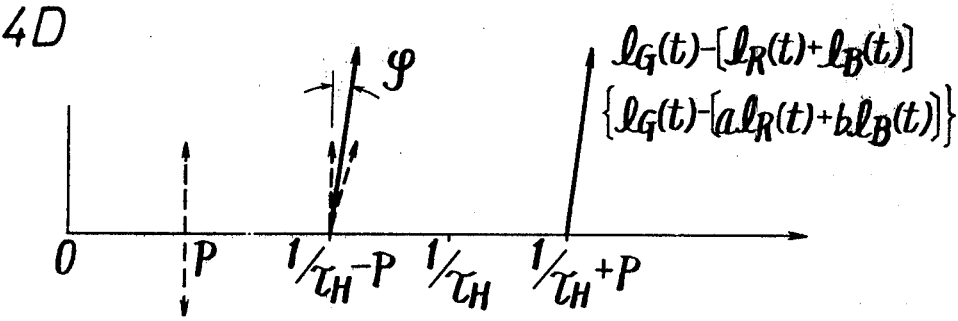
Figure 4E:
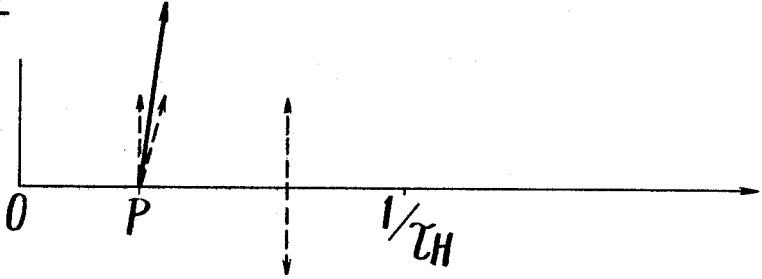

That is, in a composite signal of outputs $l_R(t)$ and $l_B(t)$ as shown in FIG. 4B, the phases of side-band components are not correctly opposite to those of side-band components of the output $l_G(t)$ shown in FIG. 4A, so that vestigial components exist in the composite signal of outputs $l_G(t)$, $l_R(t)$ and $l_B(t)$ as shown in FIG. 4C. In this case, however, since the base-band components of respective signals are coincident in phase, if the composition such as $l_G(t) - [l_R(t) + l_B(t)]$ is carried out, the respective base-band components are cancelled by each other, resulting in zero, while the side-band components are obtained as a vector sum as shown in FIG. 4D. Accordingly, if the side-band components and base-band components are interchanged with each other as shown in FIG. 4E, converted side-band components can be utilized as a luminance signal which is free from undesired signals.

Figure 5:
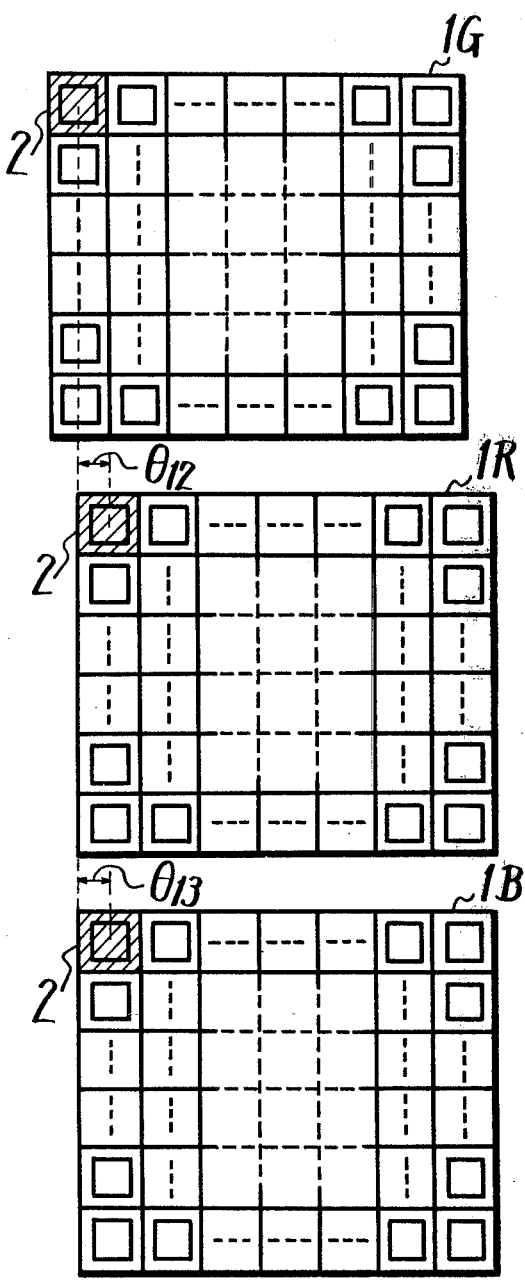
FIG. 5 is a view showing another arrangement of imaging devices according to this invention.
Figure 2:
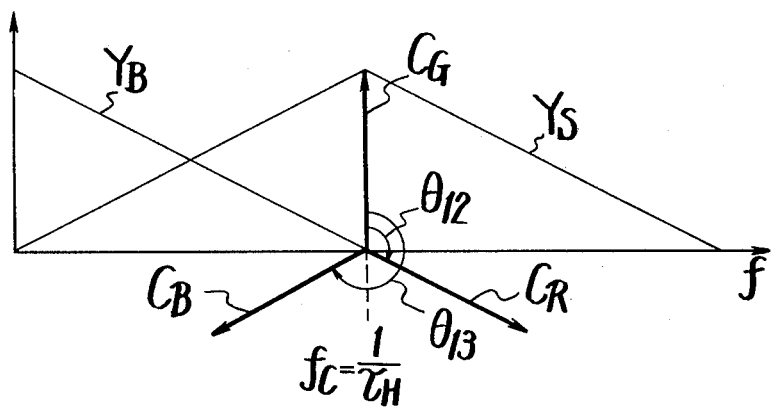
FIG. 2 is a graph showing frequency characteristics of outputs from the imaging devices shown in FIG. 1.
Figure 6:
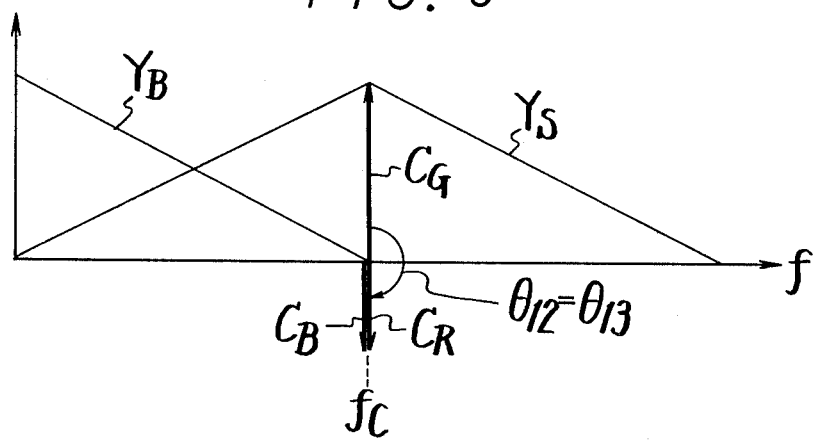
FIG. 6 is a graph showing frequency characteristics of outputs from the imaging devices shown in FIG. 5.

Thus, even in a case that the mechanical arrangement of respective imaging devices is not proper, it is possible to produce a luminance signal in which an error signal is cancelled. When a solid state color camera system is constructed, imaging devices 1G, 1R and 1B can be arranged as shown in FIG. 5, so that a relation of $\theta_{12} = \theta_{13} = \pi$ is established and the levels of a composite signal may satisfy the relation $G_L = R_L + B_L$ upon picking-up a black and white image, where $G_L$, $R_L$ and $B_L$ are levels of respective outputs of the devices 1G, 1R and 1B. In this case, even though $\theta_{12}$ and $\theta_{13}$ are not properly shifted by a distance corresponding to $\pi$ radian, a luminance signal having no noise can be obtained according to this invention. FIG. 6 shows levels and phase relation of signals derived from the devices 1G, 1R and 1B arranged as shown in FIG. 5.

One embodiment of this invention is shown in FIG. 7. This embodiment is used in a color television camera system having the device arrangement as shown in FIG. 5.

Figure 12:
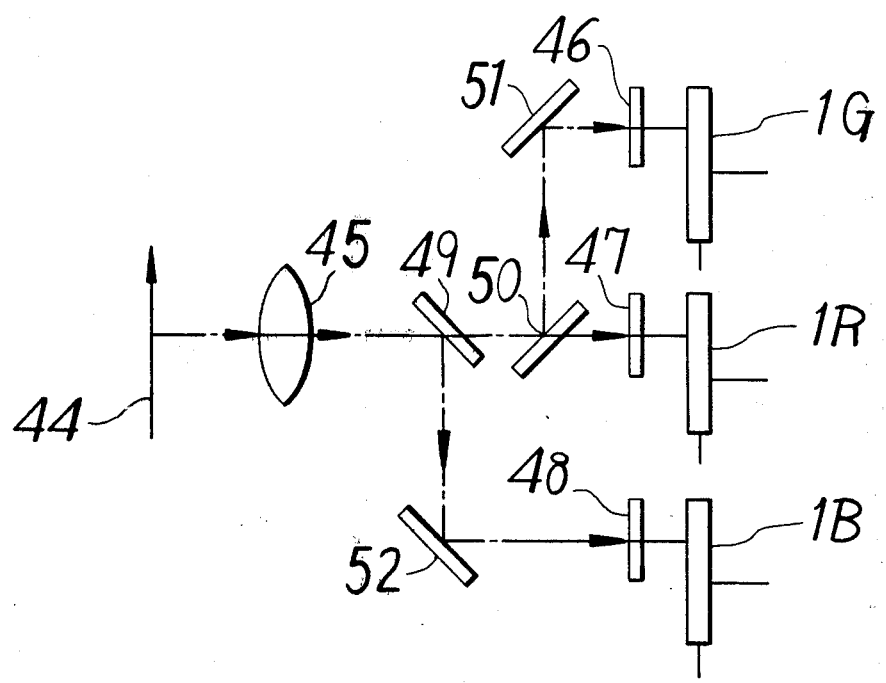
FIG. 12 is an illustration of the optical means for projecting the image of the object on the CCD imagers.

In FIG. 12, taken with FIG. 7, an image of an object 44 focused through a lens 45 is divided into three portions which are fed, by means of mirrors 49, 50 and 50 through color filters 46, 47 and 48, respectively to imaging devices 1G, 1R and 1B. Color filters are disposed in front of the respective devices. Horizontal shift registers (not shown) provided in the devices 1G, 1R and 1B are applied with a sampling (reading-out) clock pulse $P_C$ with a frequency of, for example, $1/\tau_H$ through respective terminals 3G, 3R and 3B. The clock pulse $P_C$ fed to the respective chips can be arranged to have the phases equal to their spatial phases. In this case, however, the clock pulse $P_C$ having the same phase is supplied to the respective devices 1G, 1R and 1B, and after sampling, the output signals therefrom are caused to match with the spatial phases.

An output $S_G$ from the chip 1G is supplied through a sample-and-hold circuit 5G for waveform shaping to another sample-and-hold circuit 7G for phase matching. The clock pulse $P_C$ is used as each sampling signal for these circuits 5G and 7G. However, the phases of respective sampling pulses to be fed to the circuits 5G and 7G are a little different from that of the original clock pulse $P_C$ because the correct output $S_G$ can not be sampled with a sampling signal in phase with the pulse $P_C$. To this end, a phase shifter 6G is used for the circuit 5G and a phase controller 8G is used for the circuit 7G. The phase controller 8G may be omitted because the phase-shifted pulse from the phase shifter 6G can be theoretically applied to the circuit 7G with the same effect.

The other outputs $S_R$ and $S_B$ from the imagers 1R and 1B are similarly shaped in waveform before being adjusted in phase. The sampling phases $\Psi_{12}$ and $\Psi_{13}$ are adjusted so as to coincide with the spatial phases $\theta_{12}$ and $\theta_{13}$. As a result, the following relation is obtained.

$$\theta_{12}=\Psi_{12} \text{ and } \theta_{13}=\Psi_{13} \quad (7)$$

Thus, the spatial phases and the time phases are completely coincident with each other.

The phase-adjusted imager outputs $S_G$, $S_R$ and $S_B$ from the respective circuits 7G, 7R and 7B are fed to an error compensating circuit 20 where undesired components contained therein are eliminated. The error compensating circuit 20 includes a cancelling circuit 21 for cancelling base-band components in the outputs $S_G$, $S_R$ and $S_B$ and a balanced modulator 22 for frequency-converting the output from the cancelling circuit 21. The cancelling circuit 21 is practically formed of a subtraction circuit.

In order to cancel the base-band components, the following condition is required.

$$L_G - aL_R - bL_B = 0 \quad (8)$$

where a and b are gain ratios of the imager outputs $S_R$ and $S_B$ to the imager output $S_G$, respectively, and $L_G$, $L_R$ and $L_B$ are brightness of green, red and blue colors of the focused image. Of course, it is sufficient if the above condition is applicable for a black and white image to be focused. Further, when the black and white image is picked up, the circuit adjustment is made so as to establish the following relation:

$$L_G = L_R = L_B \quad (9)$$

Accordingly, if the values of a and b are selected in a predetermined manner, the base-band components can be completely cancelled. In other words, if $S_G$, $S_B$ and $S_R$ are expressed by $l_G(t)$, $l_B(t)$ and $l_R(t)$ as the equations (2), (4) and (5), the base-band components are cancelled and the side-band components are obtained as the vector sum as shown in FIG. 4D.

In the case of FIG. 5, a and b are selected to be 0.5 and $\theta_{12}$ and $\theta_{13}$ should be $\pi$. But actually $\theta_{12}$ and $\theta_{13}$ may be different from $\pi$ due to the alignment difficulty.

Now, special attention will be paid to the relation between the phases of FIG. 4C, resulting from the prior art signal processing and those of FIG. 4D resulting from the above-mentioned signal processing. At first, in FIG. 4C, the desired base-band components having frequency p and the undesired side-band components are both obtained. On the other hand, at the cancelling circuit 21, only the side-band components existing at the frequencies $(1/\tau_H - p)$ and $(1/\tau_H + p)$ are obtained in contrast with the base-band components of FIG. 4C. The phase relation shown in FIG. 4D is obtained so far as the equations (7) and (8) are satisfied. The side-band components shown in FIG. 4D are originally undesired signals. However, if these components are frequency-converted into the base-band frequency range, the above undesired signals themselves can be used as the base-band components. In this case, the frequency-converted base-band components are considered as undesired signals, but these undesired signals are completely cancelled and hence there is no influence to be exerted.

Accordingly, in this invention the balanced modulator 22 for frequency conversion is provided at the rear stage of the cancelling circuit 21 after a low pass filter 23. A modulating pulse Pm for the balanced modulator 22 is obtained from the clock pulse Pc through a phase shifter 24 so that the phase of the modulating pulse Pm is selected in accordance with a phase $\Psi$ (refer to FIG. 4D) which is caused by the alignment error. A modulated output from the balanced modulator 22 becomes as shown in FIG. 4E. In other words, the modulation is carried out without changing the phase of the modulating pulse Pm.

The filter characteristics of the low pass filter 23 is selected in the following manner. At first, the output l(t) of the cancelling circuit 21 is expressed as follows:

$$\begin{aligned}
l(t) &= l_G(t) - al_R(t) - bl_B(t) \quad (10) \\
&= K\{G(p)(L_G - aL_R - bL_B)\cos 2\pi pt \\
&+ G(1/\tau_H - p)[L_G\cos 2\pi(1/\tau_H - p)t \\
&- aL_R\cos(2\pi(1/\tau_H - p)t - \psi_{12}) \\
&- bL_B\cos(2\pi(1/\tau_H - p)t - \psi_{13})] \\
&+ G(1/\tau_H + p)[L_G\cos 2\pi(1/\tau_H + p)t \\
&- aL_R\cos(2\pi(1/\tau_H + p)t - \psi_{12}) \\
&- bL_B\cos(2\pi(1/\tau_H + p)t - \psi_{13})] \\
&+ G(2/\tau_H - p)[L_G\cos(2\pi(2/\tau_H - p)t \\
&- aL_R\cos(2\pi(2/\tau_H - p)t - 2\psi_{12}) \\
&- bL_B\cos(2\pi(2/\tau_H - p)t - (2\psi_{13})] \\
&+ \ldots\}
\end{aligned}$$

When the focused image is a black and white one, the aforesaid equations (8) and (9) are established, so that the first term of the equation (1) becomes zero. In this case, when the output l(t) of the cancelling circuit 21 is directly fed to the balanced modulator 22 without passing through the filter 23, the modulated output $l_0(t)$ from the modulator 22 is expressed as follows:

$$\begin{aligned}
l_0(t) &= K'\{G(1/\tau_H - p)[\cos(2\pi pt - \eta) \quad (11) \\
&- a\cos(2\pi pt + \psi_{12} - \eta) \\
&- b\cos(2\pi pt + \psi_{13} - \eta)] \\
&+ G(1/\tau_H + p)[\cos(2\pi Pt + \eta) \\
&- a\cos(2\pi pt - \psi_{12} + \eta) \\
&- b\cos(2\pi pt - \psi_{13} + \eta)] \\
&+ G(2/\tau_H - p)[\cos(2\pi(1/\tau_H - p)t + \eta) \\
&- a\cos(2\pi(1/\tau_H - p)t - 2\psi_{12} + \eta) \\
&- b\cos(2\pi(1/\tau_H - p)t - 2\psi_{13} + \eta)] \\
&+ \ldots
\end{aligned}$$

where $\eta = \pi$

In the above equation (11), the signal components of the first and second terms are base-band components converted to the high frequency range, but the signal components of and after the third term are undesired signals. Now, when the following relation is satisfied:

$$|p| \leq 1/\tau_H \quad (12).$$

the components of and after the third term of the equation (11) must be kept always zero. Therefore, in order to make these undesired components zero, the frequency characteristics G(f) of the transmission path is necessary to be determined as follows:

$$G(f) = 1 \ldots |f| \leq 1/\tau_H \quad (13)$$
$$0 \ldots f > 1/\tau_H$$

Accordingly, the filter 23 to be used is selected with low-pass filter characteristics with a cut-off frequency of $1/\tau_H$.

As a result, the modulated output $I_0'(t)$ of the balanced modulator 22 in the case of using the filter 23 includes only the signal components of the first term of the of the equation (11) as follows:

$$I_0'(t) = K'G(1/\tau_H - p)[\cos(2\pi pt - \eta) \quad (14)$$
$$- a\cos(2\pi pt + \psi_{12} - \eta)$$
$$- b\cos(2\pi pt + \psi_{13} - \eta)]$$

To the output stage of the balanced modulator 22 is further connected a low pass filter 25, which is similar to the low-pass filter 23 at the front stage, to eliminate the base-band components which are modulated to $(1/\tau_H + p)$. With the signal process as mentioned above, the finally obtainable output $S_0$ contains no side-band component in its high frequency range with the result that the alignment error is compensated for.

Figure 8:
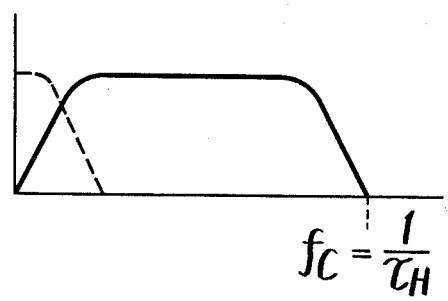
FIG. 8 is a view showing frequency characteristics used for explaining an operation of the embodiment shown in FIG. 7.

The frequency response of the composite output $S_0$ is shown in FIG. 8 by a solid line. On the transmission paths of imager outputs $S_G$, $S_R$ and $S_B$ are provided low pass filters 28G, 28R and 28B, respectively, the cut-off frequency of each being selected to be about 1 MHz, so that low frequency outputs are obtained therefrom as shown by a dotted line in FIG. 8. Thus, the low frequency outputs from the filters 28G, 28R and 28B are added with the composite output $S_0$ at adders 29G, 29R and 29B, respectively, to produce respective outputs $S_{0G}$, $S_{0R}$ and $S_{0B}$ of the imaging devices 1G, 1R and 1B. These outputs $S_{0G}$, $S_{0R}$ and $S_{0B}$ are supplied to a color encorder 30 as well known, and, for example, an NTSC system color television signal is obtained from a terminal 30a. In FIG. 7, 27 designates a delay circuit.

As described above, according to the circuit arrangement of this invention, the alignment error can be completely compensated for by an electric process only, so that no influence is exerted on a picture image and the frequency range of base-band components can be enlarged.

According to my experiments, when the spatial phases as described in the embodiment of FIG. 7 are used, it is ascertained that the alignment error can be absorbed almost positively, even though they are deviated from the proper phase by about 50%. Even in the case of using the spatial arrangement as shown in FIG. 1, an allowable error which is about five times as large as the prior art can be absorbed. In other words, when two micro meters (μm) is assumed to be the maximum allowable value in the prior art, the devices with alignment error up to about ten μm can be fully used in a practical manner in the present invention.

In the above mentioned embodiment, the base-band components of the imager outputs $S_G$, $S_R$ and $S_B$ are cancelled before the outputs are subjected to conversion. However, it is also possible to cancel the imager outputs $S_G$, $S_R$ and $S_B$ after being subjected to balanced modulation. Further, at least two imaging devices are required, but they are not limited to three.

The above example is described with respect to the compensation of alignment error when the arrangement of imaging devices is positively changed. However, this invention is also applicable to the compensation of positional error in the case when the imager chips are arranged at the same position.

FIG. 9 shows another embodiment of this invention in the case of producing a luminance signal Y. In this embodiment, there are newly provided adders 31 and 32. The outputs from the low pass filters 28G, 28R and 28B are respectively applied to the adder 31 to produce a low frequency component $Y_L$ of the imager outputs $S_G$, $S_R$ and $S_B$. While the composite output $S_0$ from the error compensating circuit 20 is utilized as a high frequency component $Y_H$ of the luminance signal Y. These components $Y_L$ and $Y_H$ are added to each other at the adder 32 to produce the luminance signal Y.

Figure 10A:
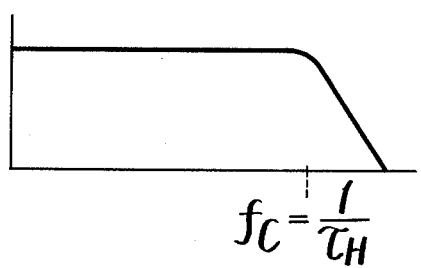
FIGS. 10A and 10B are views showing frequency characteristics of filters used in this invention.
Figure 10B:
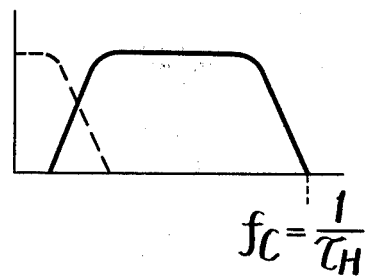
Figure 11:
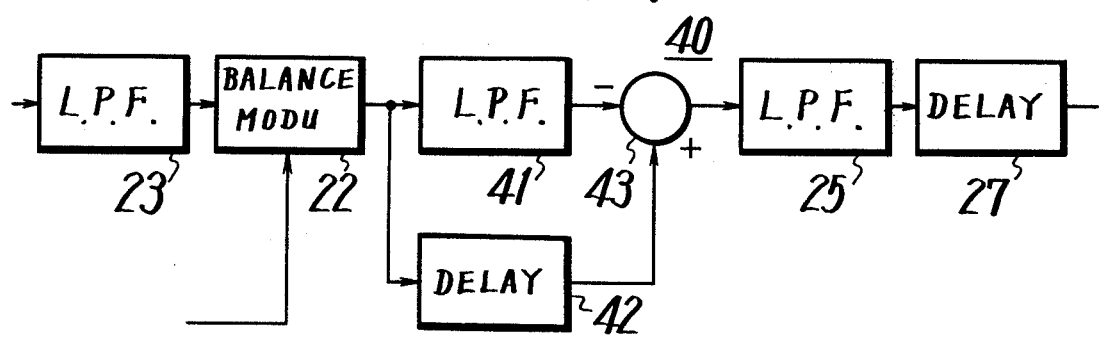
FIG. 11 is a partial view of the main system showing a further embodiment of this invention.

In the example of FIG. 7, the cut-off frequency of the filter 23 is selected to be $1/\tau_H$. However, when using a low-pass filter including a higher frequency portion than $1/\tau_H$ as shown in FIG. 10A, the higher frequency portion contains side-band components of higher harmonics of $(2/\tau_H - p)$, so that after the signal conversion these undesired components will exist at the lower frequency side. For this reason, a circuit 40 for eliminating the lower frequency components, which contain undesired signals, can be provided at the rear stage of the balanced modulator 22 as shown in FIG. 11. The eliminating circuit 40 comprises a low-pass filter 41 with filter characteristic as shown in FIG. 10B by a dotted line, a delay circuit 42 and an adder 43. Thus, modulated output $S_0$ with a band shown in FIG. 10B by a solid line is produced, in which the undesired signals are eliminated. The signal process after the modulated output $S_0$ being obtained is the same as in FIG. 7, so that its description will be omitted.

FIG. 12 is a diagrammatic showing of the object 44, the image of which is being projected through a lens system which includes a lens 4t, via mirrors 49, 50, 51 and 52, through color filters 46, 47 and 48 respectively, onto the CCD imagers 1G, 1R and 1B.

It will be apparent that many modifications and variations may be effected without departing from the spirit and scope of the novel concepts of the present invention.

I claim as my invention:

1. A solid state television camera having a plurality of image sensing chips comprising:
   (a) optical means for projecting different colors of an image of an object on different image sensing chips which have predetermined lateral positions,
   (b) read-out means for reading-out output signals from said image sensing chips with timings corresponding to said predetermined lateral positions of the projected object image on the image sensing chips,
   (c) means for mixing said output signals from said image sensing chips so as to cancel the base-band components in said signals,
   (d) means for deriving the side-band components included in said output signals of the image sensing chips from the output of said mixing means, and wherein said side-band component deriving means include frequency converting means to which is supplied a converting carrier having a frequency equal to a read-out clock fed to said read-out means.

2. A solid state television camera as set forth in claim 1, wherein said side-band component deriving means include low pass filter means which cut off undesired signal components.

3. A solid state television camera as set forth in claim 1, wherein each imaging device has color filter means and an output signal from said side-band component deriving means is used as a portion of a luminance signal.

4. A solid state television camera as set forth in claim 3, wherein said side-band component deriving means include low pass filter means, and said output signal from said side-band component deriving means becomes a high frequency component of said luminance signal.

5. A solid state television camera as set forth in claim 5, wherein the number of said image sensing chips used is three, and green, red and blue color filters are respectively provided, in front of said image sensing chips.

6. A solid state television camera as set forth in claim 1, wherein said side-band component deriving means further include a first low pass filter which is inserted between said mixing means and said frequency converting means, and a second low pass filter which is applied with an output of said frequency converting means to produce a desired side-band component.

7. A solid state television camera having a plurality of image sensing chips comprising:
(a) optical means for projecting different colors of an image of an object on different image sensing chips which have predetermined lateral positions,
(b) read-out means for reading-out output signals from said image sensing chips with timings corresponding to said predetermined lateral positions of the projected object image on the image sensing chips,
(c) said output signals from the image sensing chips respectively supplied to frequency converters and each being applied with a converting carrier having a frequency equal to the read-out clock fed to said read-out means, and
(d) mixing means, and the frequency converted output signals from each of said frequency converters fed to said mixing means for cancelling the baseband components of original output signals.

* * * * *